(12) United States Patent
Colosky

(10) Patent No.: US 7,543,679 B2
(45) Date of Patent: Jun. 9, 2009

(54) COMPENSATION OF PERIODIC SENSOR ERRORS IN ELECTRIC POWER STEERING SYSTEMS

(75) Inventor: Mark P. Colosky, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 501 days.

(21) Appl. No.: 11/495,199

(22) Filed: Jul. 28, 2006

(65) Prior Publication Data

US 2008/0023255 A1     Jan. 31, 2008

(51) Int. Cl.
B62D 5/04 (2006.01)

(52) U.S. Cl. ............... 180/444; 701/41; 701/34; 701/31

(58) Field of Classification Search ......... 180/444; 701/41, 42, 34, 35, 31
See application file for complete search history.

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kühnlein | 318/254 |
| 4,447,771 A | 5/1984 | Whited | 18/661 |
| 4,509,611 A | 4/1985 | Kade et al. | 180/446 |
| 4,511,827 A | 4/1985 | Morinaga et al. | 318/254 |
| 4,556,811 A | 12/1985 | Hendricks | 310/266 |

(Continued)

FOREIGN PATENT DOCUMENTS

DE     195 08 607     8/1996

(Continued)

OTHER PUBLICATIONS

Berendsen, Carsten-Sunnke; Champenois, Gerard; and Bolopion Alain; "Commutation Strategies For Brushless DC Motors: Influence on Instant Torque", Apr. 1993, *IEEE Transactions On Power Electronics*, vol. 8, No. 2; pp. 231-236.

(Continued)

*Primary Examiner*—Paul N Dickson
*Assistant Examiner*—Tashiana Adams
(74) *Attorney, Agent, or Firm*—Thomas N. Twomey

(57) ABSTRACT

An electric power steering system includes a steering wheel, an electric assist motor operatively coupled to the steering wheel, and an electronic controller operatively coupled to the assist motor. A steering wheel position sensor provides an output indicative of an angular position of the steering wheel. A motor position sensor provides an output indicative of a relative angular position for the motor. Steering wheel position sensor output is acquired at each of a plurality of angular positions of the motor, thereby establishing a set of points defining a curvilinear relationship between steering wheel sensor output and motor position sensor output. The set of points is sampled to calculate a straight line which approximates the curvilinear relationship, thereby reducing periodic errors in the steering wheel sensor output. The straight line is employed to determine a position offset for the motor position sensor output corresponding to a system zero position. The system zero position is a position for which the vehicle will travel along a linear, substantially straight-ahead path.

18 Claims, 3 Drawing Sheets

U.S. PATENT DOCUMENTS

| | | | |
|---|---|---|---|
| 4,558,265 A | 12/1985 | Hayashida et al. | 318/561 |
| 4,633,157 A | 12/1986 | Streater | 318/723 |
| 4,672,253 A | 6/1987 | Tajima et al. | 310/269 |
| 4,686,437 A | 8/1987 | Langley et al. | 318/254 |
| 4,688,655 A | 8/1987 | Shimizu | 180/79.1 |
| 4,692,645 A | 9/1987 | Gotou | 310/184 |
| 4,721,894 A | 1/1988 | Graber | 318/473 |
| 4,739,201 A | 4/1988 | Brigham et al. | 310/49 R |
| 4,745,984 A | 5/1988 | Shimizu | 180/79.1 |
| 4,771,845 A | 9/1988 | Shimizu | 180/446 |
| 4,780,658 A | 10/1988 | Koyama | 318/808 |
| 4,782,272 A | 11/1988 | Buckley et al. | 318/254 |
| 4,789,040 A | 12/1988 | Morishita et al. | 180/446 |
| 4,805,126 A | 2/1989 | Rodems | 702/106 |
| 4,814,677 A | 3/1989 | Plunkett | 318/254 |
| 4,835,448 A | 5/1989 | Dishner et al. | 318/254 |
| 4,837,692 A | 6/1989 | Shimizu | 364/424.05 |
| 4,856,607 A | 8/1989 | Sueshige et al. | 180/422 |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |
| 4,912,379 A | 3/1990 | Matsuda et al. | 318/254 |
| 4,988,273 A | 1/1991 | Faig et al. | 425/145 |
| 4,992,717 A | 2/1991 | Marwin et al. | 318/696 |
| 5,006,774 A | 4/1991 | Rees | 318/721 |
| 5,040,629 A | 8/1991 | Matsuoka et al. | 180/79.1 |
| 5,048,630 A | 9/1991 | Schaffer | 180/422 |
| 5,053,966 A | 10/1991 | Takahashi et al. | 701/41 |
| 5,063,011 A | 11/1991 | Rutz et al. | 264/126 |
| 5,068,591 A | 11/1991 | Hoegberg et al. | 322/29 |
| 5,069,972 A | 12/1991 | Versic | 428/407 |
| 5,076,381 A | 12/1991 | Daido et al. | 180/79.1 |
| 5,122,719 A | 6/1992 | Bessenyei et al. | 318/629 |
| 5,175,479 A | 12/1992 | Tajima et al. | 318/560 |
| 5,223,775 A | 6/1993 | Mongeau | 318/432 |
| 5,238,079 A | 8/1993 | Gorim | 180/142 |
| 5,239,490 A | 8/1993 | Masaki et al. | 364/565 |
| 5,245,286 A | 9/1993 | Carlson et al. | 312/263 |
| 5,272,429 A | 12/1993 | Lipo et al. | 318/808 |
| 5,309,373 A | 5/1994 | Beebe et al. | 702/41 |
| 5,331,245 A | 7/1994 | Burgbacher et al. | 310/186 |
| 5,339,243 A | 8/1994 | Matsuoka et al. | 701/43 |
| 5,345,156 A | 9/1994 | Moreira | 318/254 |
| 5,349,278 A | 9/1994 | Wedeen | 318/632 |
| 5,349,351 A | 9/1994 | Obara et al. | 341/141 |
| 5,361,210 A | 11/1994 | Fu | 364/424.05 |
| 5,379,741 A | 1/1995 | Matysiewicz et al. | 123/497 |
| 5,428,285 A | 6/1995 | Koyama et al. | 318/799 |
| 5,433,541 A | 7/1995 | Hieda et al. | 400/279 |
| 5,442,268 A | 8/1995 | Goodarzi et al. | 318/432 |
| 5,444,341 A | 8/1995 | Kneifel, II et al. | 318/432 |
| 5,450,306 A | 9/1995 | Garces et al. | 363/41 |
| 5,460,235 A | 10/1995 | Shimizu | 180/79.1 |
| 5,461,293 A | 10/1995 | Rozman et al. | 318/603 |
| 5,465,210 A * | 11/1995 | Walenty | 701/1 |
| 5,467,275 A | 11/1995 | Takamoto et al. | 364/426.01 |
| 5,469,215 A | 11/1995 | Nashiki | 318/432 |
| 5,475,289 A | 12/1995 | McLaughlin et al. | 318/432 |
| 5,493,200 A | 2/1996 | Rozman et al. | 322/10 |
| 5,517,415 A | 5/1996 | Miller et al. | 364/424.05 |
| 5,527,053 A | 6/1996 | Howard | 280/90 |
| 5,528,497 A | 6/1996 | Yamamoto et al. | 701/41 |
| 5,554,913 A | 9/1996 | Ohsawa | 318/434 |
| 5,568,389 A | 10/1996 | McLaughlin et al. | 364/424.05 |
| 5,569,994 A | 10/1996 | Taylor et al. | 318/700 |
| 5,579,188 A | 11/1996 | Dunfield et al. | 360/99.08 |
| 5,585,708 A | 12/1996 | Richardson et al. | 318/800 |
| 5,616,999 A | 4/1997 | Matsumura et al. | 318/632 |
| 5,623,409 A | 4/1997 | Miller | 364/424.051 |
| 5,625,239 A | 4/1997 | Persson et al. | 310/68 B |
| 5,625,269 A | 4/1997 | Ikeda | 318/696 |
| 5,642,044 A | 6/1997 | Weber | 324/207.25 |
| 5,656,911 A | 8/1997 | Nakayama et al. | 318/718 |
| 5,668,721 A | 9/1997 | Chandy | 701/41 |
| 5,668,722 A | 9/1997 | Kaufmann et al. | 701/41 |
| 5,672,944 A | 9/1997 | Gokhale et al. | 318/254 |
| 5,699,207 A | 12/1997 | Supino et al. | 360/78.09 |
| 5,701,065 A | 12/1997 | Ishizaki | 318/701 |
| 5,712,802 A | 1/1998 | Kumar et al. | 702/132 |
| 5,721,479 A | 2/1998 | Kumar et al. | 318/801 |
| 5,739,650 A | 4/1998 | Kimura et al. | 318/254 |
| 5,744,921 A | 4/1998 | Makaran | 218/254 |
| 5,777,449 A | 7/1998 | Schlager | 318/459 |
| 5,780,986 A | 7/1998 | Shelton et al. | 318/432 |
| 5,803,197 A | 9/1998 | Hara et al. | 180/248 |
| 5,811,904 A | 9/1998 | Tajima et al. | 310/156.45 |
| 5,811,905 A | 9/1998 | Tang | 310/179 |
| 5,811,949 A | 9/1998 | Garces | 318/448 |
| 5,811,957 A | 9/1998 | Bose et al. | 318/802 |
| 5,828,973 A | 10/1998 | Takeuchi et al. | 701/41 |
| 5,852,355 A | 12/1998 | Turner | 318/701 |
| 5,881,836 A | 3/1999 | Nishimoto et al. | 180/446 |
| 5,898,990 A | 5/1999 | Henry | 29/598 |
| 5,917,721 A | 6/1999 | Kerkman et al. | 363/98 |
| 5,919,241 A | 7/1999 | Bolourchi et al. | 701/41 |
| 5,920,161 A | 7/1999 | Obara et al. | 318/139 |
| 5,929,590 A | 7/1999 | Tang | 318/701 |
| 5,934,398 A | 8/1999 | Hotta | 180/65.8 |
| 5,936,322 A | 8/1999 | Yamaguchi et al. | 310/156.19 |
| 5,941,338 A | 8/1999 | Miller et al. | 180/421 |
| 5,948,030 A | 9/1999 | Miller et al. | 701/41 |
| 5,962,999 A | 10/1999 | Nakamura et al. | 318/432 |
| 5,963,706 A | 10/1999 | Baik | 388/804 |
| 5,965,995 A | 10/1999 | Seibel et al. | 318/805 |
| 5,967,253 A | 10/1999 | Collier-Hallman | 180/421 |
| 5,977,740 A | 11/1999 | McCann | 318/701 |
| 5,977,741 A | 11/1999 | DeLange et al. | 318/801 |
| 5,984,042 A | 11/1999 | Nishimoto et al. | 180/446 |
| 5,992,556 A | 11/1999 | Miller | 180/446 |
| 6,002,226 A | 12/1999 | Collier-Hallman et al. | 318/439 |
| 6,002,234 A | 12/1999 | Ohm et al. | 318/729 |
| 6,009,003 A | 12/1999 | Yeo | 363/37 |
| 6,013,994 A | 1/2000 | Endo et al. | 318/432 |
| 6,034,459 A | 3/2000 | Matsunobu et al. | 310/156.38 |
| 6,034,460 A | 3/2000 | Tajima et al. | 310/179 |
| 6,034,493 A | 3/2000 | Boyd et al. | 318/254 |
| 6,039,144 A | 3/2000 | Chandy et al. | 180/446 |
| 6,043,624 A | 3/2000 | Masaki et al. | 318/723 |
| 6,046,560 A | 4/2000 | Lu et al. | 318/432 |
| 6,049,182 A | 4/2000 | Nakatani et al. | 318/432 |
| 6,050,360 A | 4/2000 | Pattok et al. | 180/446 |
| 6,064,172 A | 5/2000 | Kuznetsov | 318/716 |
| 6,082,171 A | 7/2000 | Wiggenhagen | |
| 6,088,661 A | 7/2000 | Poubion | 702/130 |
| 6,092,618 A | 7/2000 | Collier-Hallman | 180/422 |
| 6,104,150 A | 8/2000 | Oohara et al. | 318/254 |
| 6,121,852 A | 9/2000 | Mizoguchi et al. | 333/35 |
| 6,129,172 A | 10/2000 | Yoshida et al. | 180/446 |
| 6,184,638 B1 | 2/2001 | Kinpara | 318/432 |
| 6,188,189 B1 | 2/2001 | Blake | 318/471 |
| 6,250,419 B1 | 6/2001 | Chabaan et al. | 180/443 |
| 6,250,421 B1 * | 6/2001 | Poshadlo | 180/446 |
| 6,250,520 B1 | 6/2001 | Richard et al. | 222/590 |
| 6,272,947 B1 | 8/2001 | Howard | 74/499 |
| 6,281,650 B1 | 8/2001 | Yutkowitz | 318/561 |
| 6,281,659 B1 | 8/2001 | Giuseppe | 318/799 |
| 6,323,614 B1 | 11/2001 | Palazzolo et al. | 318/560 |
| 6,329,781 B1 | 12/2001 | Matsui et al. | 318/717 |
| 6,334,503 B1 | 1/2002 | Fukumura et al. | 180/446 |
| 6,338,016 B1 | 1/2002 | Miller et al. | 701/43 |
| 6,344,721 B2 | 2/2002 | Seki et al. | 318/254 |
| 6,349,789 B1 | 2/2002 | Nakano et al. | 180/446 |
| 6,360,841 B1 | 3/2002 | Blandino et al. | 180/443 |
| 6,373,211 B1 | 4/2002 | Henry et al. | 318/432 |

| | | |
|---|---|---|
| 6,380,658 B1 | 4/2002 | Sebastian et al. ............ 310/261 |
| 6,389,338 B1 | 5/2002 | Chandy et al. ................ 701/29 |
| 6,392,418 B1 | 5/2002 | Mir et al. .................... 324/503 |
| 6,408,234 B1* | 6/2002 | Wittig ......................... 701/41 |
| 6,411,052 B1 | 6/2002 | Mir et al. .................... 318/434 |
| 6,426,602 B1 | 7/2002 | McCann et al. ............. 318/432 |
| 6,429,565 B1 | 8/2002 | Matsunobu et al. .... 310/156.38 |
| 6,429,620 B2 | 8/2002 | Nakazawa .................. 318/701 |
| 6,448,731 B1 | 9/2002 | Miller et al. ................ 318/488 |
| 6,470,225 B1 | 10/2002 | Yutkowitz .................... 700/44 |
| 6,489,761 B1 | 12/2002 | Schroeder et al. ...... 324/207.25 |
| 6,498,409 B1 | 12/2002 | Collier-Hallman et al. 310/68 B |
| 6,501,243 B1 | 12/2002 | Kaneko et al. ............. 318/700 |
| 6,510,396 B1 | 1/2003 | Colosky ..................... 702/85 |
| 6,516,680 B1 | 2/2003 | Nakamura et al. ....... 74/388 PS |
| 6,520,279 B2 | 2/2003 | Fukumoto et al. ........... 180/446 |
| 6,538,429 B2 | 3/2003 | Schroeder et al. ........ 324/207.2 |
| 6,549,871 B1 | 4/2003 | Mir et al. .................... 702/145 |
| 6,555,985 B1 | 4/2003 | Kawabata et al. ........... 318/685 |
| 6,564,125 B2 | 5/2003 | Pattok et al. .................. 701/29 |
| 6,580,627 B2 | 6/2003 | Toshio ......................... 363/98 |
| 6,614,223 B2 | 9/2003 | Schroeder et al. ...... 324/207.22 |
| 6,694,287 B2 | 2/2004 | Mir et al. .................... 702/183 |
| 6,713,921 B2 | 3/2004 | Sebastian et al. ....... 310/156.38 |
| 6,713,922 B2 | 3/2004 | Piech et al. ............ 310/156.43 |
| 6,720,751 B2 | 4/2004 | Plasz et al. ................. 318/567 |
| 6,721,629 B2 | 4/2004 | Wendling et al. ........... 700/279 |
| 6,759,780 B2 | 7/2004 | Liu et al. .................... 310/184 |
| 6,788,013 B2 | 9/2004 | Islam et al. ................. 318/432 |
| 6,900,607 B2 | 5/2005 | Kleinau et al. .............. 318/432 |
| 6,906,443 B2 | 6/2005 | Luo et al. ............. 310/156.47 |
| 6,914,399 B2 | 7/2005 | Kushion et al. ............. 318/434 |
| 6,940,198 B2 | 9/2005 | Ionel et al. ............ 310/156.47 |
| 6,965,820 B2* | 11/2005 | Amberkar et al. ............. 701/41 |
| 2002/0022912 A1 | 2/2002 | Urabe et al. ................. 701/41 |
| 2003/0033064 A1* | 2/2003 | Amberkar et al. ............. 701/41 |
| 2003/0055546 A1* | 3/2003 | Demerly et al. ............... 701/42 |
| 2003/0062868 A1 | 4/2003 | Mir et al. .................... 318/599 |
| 2003/0071594 A1 | 4/2003 | Kleinau et al. .............. 318/567 |
| 2003/0076061 A1 | 4/2003 | Kleinau et al. .............. 318/432 |
| 2003/0076064 A1 | 4/2003 | Kleinau et al. .............. 318/567 |
| 2003/0076065 A1 | 4/2003 | Shafer et al. ................ 318/567 |
| 2003/0146731 A1 | 8/2003 | Berggren et al. ............ 318/708 |
| 2003/0230947 A1 | 12/2003 | Islam et al. ............ 310/156.47 |
| 2004/0112146 A1 | 6/2004 | Islam et al. ............ 73/862.331 |
| 2005/0182542 A1 | 8/2005 | Kwasny et al. ................ 701/41 |
| 2006/0015227 A1 | 1/2006 | Knoll |

FOREIGN PATENT DOCUMENTS

| | | |
|---|---|---|
| EP | 08 08 029 A2 | 11/1997 |
| EP | 0 821 468 A2 | 1/1998 |
| EP | 08 221 30 A1 | 2/1998 |
| EP | 0 943 481 A2 | 9/1999 |
| EP | 1 283 148 | 2/2003 |
| FR | 2843085 | 2/2002 |
| JP | 09051700 | 2/1997 |
| JP | 9-271198 | 10/1997 |
| JP | 11262241 | 9/1999 |

OTHER PUBLICATIONS

Blaabjer, Frede; Pedersen, John K.; Jaeger, Ulrik; and Paul Thoegersen; "Single Current Sensor Technique In the DC Link of Three-Phase PWM-VS Inverters: A Review and a Novel Solution", Sep./Oct. 1997, *IEEE Transactions On Industry Applications*, vol. 33 No. 5; pp. 1241-1249.

De La Ree, Jaime; and Latorre, Jaime; "Permanent Magnet Machines Torque Considerations," *Conference Record of the IEEE Industry Applications Society Annual Meeting Part 1*, IEEE Catalog No. 88CH2565-0, Part 1, Oct. 2-7, 1998; pp. 32-37.

De La Ree, Jaime; and Boules, Nady; "Torque Production In Permanent-Magnet Synchronous Motors", Jan./Feb. 1989, *IEEE Transactions On Industry Applications*, vol. 25 No. 1; pp. 107-112.

Mirkazemi-moud, Mehran; Green, Tim C.; and Williams, Barry W.; "Analysis and Comparison of Real-Time Sine-Wave Generation for PMW Circuits" Jan. 1993, *IEEE Transactions On Power Electronics*, vol. 8, No. 1; pp. 46-54.

Murai, Yoshihiro; Kawase, Yoshihiro; and Ohashi, Karuharu; "Torque Ripple Improvement for Brushless DC Miniature Motors," *Conference Record of the 1987 IEEE Industry Applications Society Annual Meeting Part 1*, IEEE Catalog No. 87CH2499-2, Oct. 18-23, 1987; pp. 21-28.

Parasiliti, Francesco; Petrella, Roberto; and Tursini, Marco; "Low Cost Phase Current Sensing in DSP Based AC Drives," *IEEE Transactions*, pp. 1284-1289.

*Brown Boveri Review*, "Static Frequency Changers with "Subharmonic" Control in Conjunction with Reversible Variable-Speed A.C. Drives" Aug./Sep. 1964, vol. 51 No. 8/9; pp. 555-577.

Asaii, B., et al.; "A Simple High Efficient Torque Control For The Electric Vehicle Induction Machine Drives Without A Shaft Encoder"; Power Electronics Specialists Conference, 1995. PESC '95 Records, 26th Annual IEEE Atlanta, GA, USA Jun. 18-22, 1995, pp. 778-784.

Gotter Gottfried; "Erwarmung and Kü hlung elektrischer Maschinin"; Springer Verlag, Berlin 1954; pp. 95-116.

Zoran Lazarevic, et al.; "A Novel Approach For Temperature Estimation In Squirrel-Cage Induction Motor Without Sensors", IEEE Transactions on Instrumentation and Measurement, IEEE Inc. New York, US, vol. 48, No. 3, Jun. 1999, pp. 753-757.

European Search Report dated Jul. 15, 2008.

* cited by examiner

_US 7,543,679 B2_

COMPENSATION OF PERIODIC SENSOR ERRORS IN ELECTRIC POWER STEERING SYSTEMS

BACKGROUND

In a vehicle equipped with an electric power steering (EPS) system, a steering assist force is provided by an electric motor operatively coupled to a steering wheel through a steering column or shaft. Typically, such systems include a controller programmed to derive an assist torque signal along with a "return to center" torque signal, thereafter summing these torque signals to generate a motor command signal that is applied to the electric motor. The assist torque signal is derived using an applied torque signal indicative of torque applied to the steering wheel by a vehicle operator. The assist torque signal provides a power steering boost torque, and the "return to center" torque signal provides a bias torque for returning the steering wheel to a system zero position. The system zero position may be defined as a position for which the vehicle will travel along a linear, substantially straight-ahead path.

During EPS operation, it may be desirable to automatically determine the absolute position of the steering wheel. This position may be used, for example, to cause the steering wheel to return to center following a steering input in the form of torque applied to the steering wheel by a vehicle operator. The return to center effect simulates the self-aligning torque due to positive caster of a conventional hydraulically-operated steering system, and causes the vehicle to be more comfortably controlled by a driver.

In order to automatically determine the center position of the steering wheel in an EPS system, a motor position sensor may be employed to measure a relative angular position of the motor. However, since the motor position sensor senses relative position, the EPS system utilizes a second sensor to determine an absolute reference for the center position of the steering wheel. This second sensor is provided in the form of a steering wheel sensor mechanically connected to the steering wheel, steering column, or shaft for producing a sensor output signal indicative of the angular position of the steering wheel. Since the steering wheel may be capable of rotating through three or more revolutions, the sensor output signal may exhibit periodic errors. These periodic errors may recur at substantially the same angular position of the steering wheel for each of a plurality of rotational cycles.

Errors in the steering wheel sensor output signal are partially attributable to the mechanical connection of the steering wheel sensor to the steering wheel, steering column, or shaft. Errors are also attributable to the physical properties of the sensing mechanism used to generate the sensor signal. But regardless of the source of this error, if the steering wheel sensor output signal is used to establish the center position of the steering wheel, either the sensor must provide adequate accuracy, or an appropriate error compensation scheme must be devised. Since improvements to sensor accuracy require increasing the precision of components, materials, and mechanical tolerances, such an approach is costly and impractical. What is needed is an efficient compensation technique for correcting errors in the steering wheel sensor signal.

SUMMARY

The above described and other features are exemplified by the following Figures and Description in which an electric power steering system is disclosed that includes a steering wheel, an electric assist motor operatively coupled to the steering wheel, and an electronic controller operatively coupled to the assist motor. A steering wheel position sensor provides an output indicative of an angular position of the steering wheel. A motor position sensor provides an output indicative of a relative angular position for the motor. Steering wheel position sensor output is acquired at each of a plurality of angular positions of the motor, thereby establishing a set of points defining a curvilinear relationship between steering wheel sensor output and motor position sensor output. The set of points is sampled to calculate a straight line which approximates the curvilinear relationship, thereby reducing periodic errors in the steering wheel sensor output. The straight line is employed to determine a position offset for the motor position sensor output corresponding to a system zero position. The system zero position is a position for which the vehicle will travel along a linear, substantially straight-ahead path.

BRIEF DESCRIPTION OF THE DRAWINGS

Referring now to the Figures wherein like elements are numbered alike.

DESCRIPTION OF PREFERRED EMBODIMENTS

Figure 1:
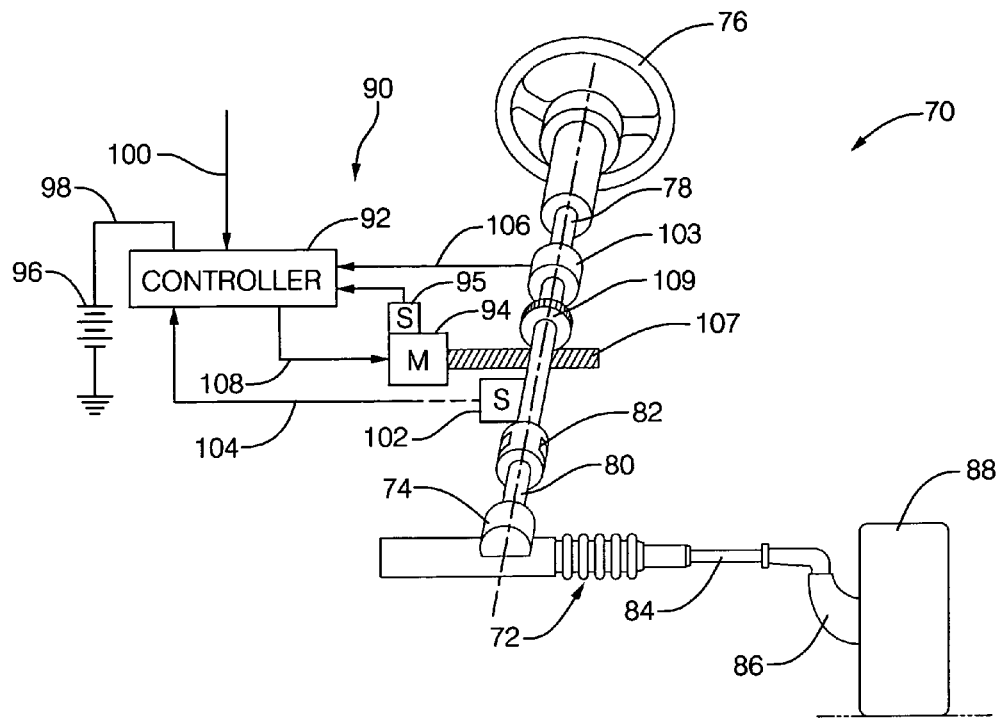
FIG. 1 is a block diagram of an electric power steering system having a controller.

FIG. 1 is a block diagram of a motor vehicle provided with an exemplary electric power steering (EPS) system 70. EPS system 70 includes a steering mechanism 72, illustratively implemented using a conventional rack and pinion steering mechanism that includes a toothed rack (not shown) and a pinion gear (also not shown) under a gear housing 74. A steering wheel 76 is coupled to an upper steering shaft 78. As steering wheel 76 is turned, a steered member or upper steering shaft 78, which is connected to a lower steering shaft 80 through a universal joint 82, turns the pinion gear. The rotation of the pinion gear moves the toothed rack, which then moves a pair of tie-rods 84 (only one shown) coupled to a pair of steering knuckles 86 (only one shown) to turn a pair of road wheels 88 (only one shown).

Electric power assist is provided through an assist unit 90 generally designated by reference numeral 90, which includes a controller 92 and an electric motor 94. A motor position sensor 95 measures the relative angular rotational position of electric motor 94. Controller 92 is powered by a vehicle power supply 96 through a supply line 98. Controller 92 receives a signal indicative of the vehicle velocity on signal line 100. Initial steering wheel position is measured by a steering wheel position sensor 102 and fed to controller 92 through line 104. Steering wheel position sensor 102 may be an optical-encoding type of sensor, a variable-resistance type of sensor, or any other suitable type of position sensor for performing the functions of steering wheel position sensor 102.

As steering wheel 76 is turned, a torque sensor 103 senses the torque applied to steering wheel 76 by the vehicle operator and provides an input steering torque signal on line 106 to controller 92. Torque sensor 103 may include a torsion bar (not shown) and a variable-resistance type of sensor (also not shown) that outputs a variable resistance signal to controller 92 through line 106 in relation to the amount of twist on the torsion bar. Other suitable torsion-sensing devices used with known signal processing techniques will suffice in alternate embodiments In response to the inputs on lines 100, 104 and 106, controller 92 sends a motor command signal through line 108 to electric motor 94. Electric motor 94 then supplies a torque assist to upper and lower steering shafts 78, 80 through a worm 107 and associated worm gear 109, in order to provide a steering torque assist to the vehicle steering system in addition to a steering force exerted by the vehicle operator. If torque sensor 103 is of the type that requires upper steering shaft 78 to be separated at the sensor between upper and lower sections (allowing some range of rotational independence), both steering wheel position sensor 102 and worm gear 109 are associated with lower steering shaft 80 below torque sensor 103, as shown.

Figure 2:
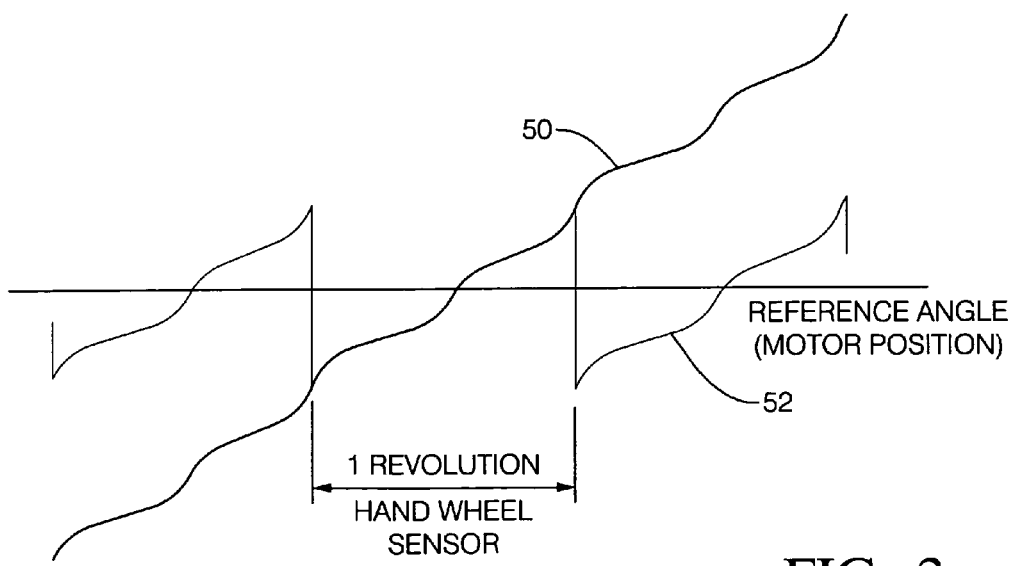
FIG. 2 is a graph showing an illustrative relationship between steering wheel position sensor output as a function of motor position reference angle.

FIG. 2 is a graph showing an illustrative relationship between steering wheel position sensor output 52 as a function of motor position reference angle obtained from motor position sensor 95 (FIG. 1). Illustratively, a raw, unprocessed steering wheel position sensor output 52 (FIG. 2) is obtained from steering wheel position sensor 102 (FIG. 1). Observe that unprocessed steering wheel position sensor output 52 is a periodic signal having a period substantially equal to one revolution of steering wheel 76. However, it is possible to process steering wheel position sensor output 52 with an appropriate DC offset waveform to produce a continuous waveform shown in FIG. 2 as processed steering wheel position sensor output 50. If the output of steering wheel position sensor 102 (FIG. 1) was substantially error-free, processed steering wheel position sensor output 50 (FIG. 2) would appear as a substantially straight line or as a substantially smooth curve.

Due to variations in mechanical tolerances of steering wheel position sensor 102 (FIG. 1), the physical configurations of devices used to fabricate steering wheel position sensor 102, hysteresis effects in steering wheel position sensor 102 and motor position sensor 95, and various other factors, processed steering wheel position sensor output 50 may include periodically recurring error components as those shown in FIG. 2. These error components may occur at fundamental frequency and harmonic frequency components corresponding to a single steering wheel 76 revolution. If these error components are not corrected or compensated, EPS system 70 will not be able to properly determine a neutral, straight-ahead position for steering wheel 76. This neutral, straight-ahead position may also be referred to as a "system zero".

Figure 3:
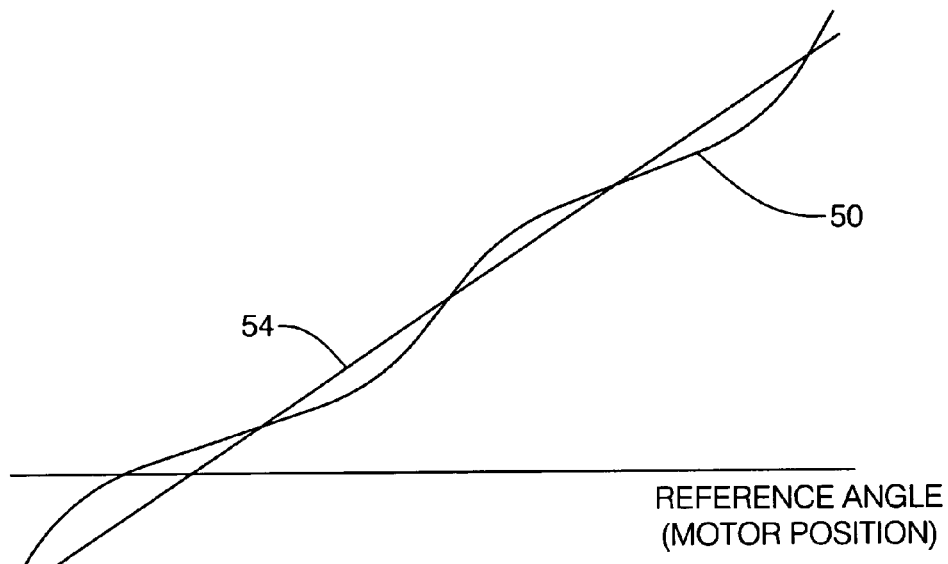
FIG. 3 is a graph showing a line computed as providing the best fit to a relationship setting forth processed steering wheel position sensor output as a function of motor position reference angle.

FIG. 3 is a graph showing a line 54 that provides the best fit (i.e., the closest match) to a relationship setting forth processed steering wheel position sensor output 50 as a function of motor position reference angle. The motor position reference angle is obtained from motor position sensor 95. As stated previously, an ideal steering wheel position sensor 102 (FIG. 1) would provide a substantially linear output. However, observe that processed steering wheel position sensor output 50 includes fundamental frequency components and harmonic frequency components related to a single period of revolution of steering wheel 76, and perhaps additional components unrelated to the revolution of steering wheel 76. These components represent sources of error that cause position sensor output 50 to deviate from a linear function.

It would be desirable to compensate for the sources of error in position sensor output 50. This may be accomplished by defining a linear relationship (i.e., a line), which most closely approximates position sensor output 50. In this manner, the curves and nonlinearities in position sensor output 50 are effectively ignored or filtered out, and an ideal sensor output function is substituted for the actual position sensor output. In the example of FIG. 3, a line 54 is defined by establishing two points that identify the relationship of the motor position reference angle to the steering wheel position sensor output 50. These points are established by sampling a plurality of points along position sensor output 50, wherein each of the sampled points has a known reference angle obtained from motor position sensor 95. Once line 54 is defined, the system zero position is determined from line 54, and a corresponding position offset is determined for motor position sensor 95.

In many situations, it may be desirable to limit sampling of points along position sensor output 50 to a certain range of values, such that only a segment of position sensor output 50 (termed a "sample window") is utilized to determine line 54. Moreover, depending upon the harmonic content of position sensor output 50, it may be desirable to utilize the same segment of position sensor output 50 every time line 54 is to be computed, and possibly when the system zero position is to be computed. Utilizing the same segment of position sensor output 50 may be desired in situations where significant errors result from third-harmonic and other odd harmonic frequency components. Even harmonics tend to cancel in one revolution of steering wheel position sensor 102 (FIG. 1), assuming that a sample window size of one revolution is employed. On the other hand, for a sample window size of one revolution, odd harmonics will not cancel and will introduce a bias effect. If the sample window size is not equal to one mechanical revolution of steering wheel position sensor 102, then the harmonic content within the sample window should be evaluated to determine if a consistent sample window selection is required.

Optionally, in some system applications, significant hysteresis may be present in the output of steering wheel position sensor 102 or motor position sensor 95. In situations where hysteresis is present, the graph of FIG. 3 can be modified to show the effect of such hysteresis, and this would double the amount of data needed to determine line 54. For example, data points on the graph of FIG. 3 would need to be shown for direction-dependent sensor motion where hysteresis occurs, and data points on the graph of FIG. 3 could also be shown for direction-dependent sensor motion where no hysteresis occurs.

Figure 4:
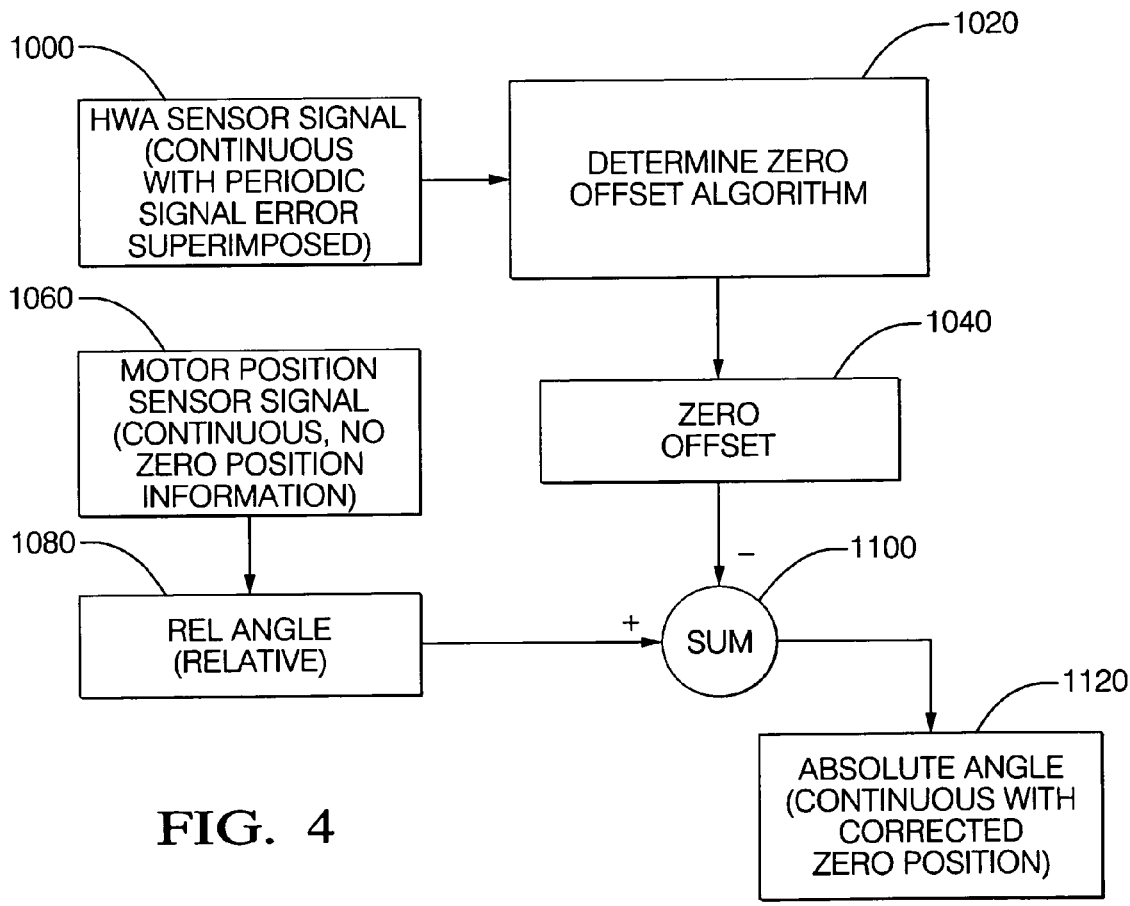
FIG. 4 is a flowchart setting forth a method for determining an absolute angle and a system zero position for an electric power steering system.

FIG. 4 is a flowchart setting forth a method for determining an absolute angle and a system zero position for an electric power steering system. The method commences at block 1000 where a steering wheel position sensor output 50 is received. This position sensor output 50 includes periodic error components as were previously discussed in connection with FIGS. 2 and 3. Returning to FIG. 4, the program proceeds to block 1020 where a "zero offset" procedure is executed to determine a position offset for motor position sensor 95 (FIG. 1) corresponding to a system zero position. Further details regarding this position offset procedure are discussed hereinafter with reference to FIG. 5.

Next, at block 1040 (FIG. 4), the zero offset algorithm returns a position offset for motor position sensor 95 (FIG. 1).

At block 1060 (FIG. 4), a signal from motor position sensor 95 is received. This signal may be continuous, but it contains no information as to system zero position. Rather, as indicated at block 1080, the received signal from motor position sensor 95 includes information specifying a relative reference angle for motor 94 (FIG. 1) position. A summer 1100 (FIG. 4) subtracts the position offset for motor position sensor 95 that was returned at block 1040 from the signal received from motor position sensor (block 1080). The output of summer 1100 is a continuous output signal providing an absolute angle reference with a compensated (corrected) system zero position (block 1120).

Figure 5:
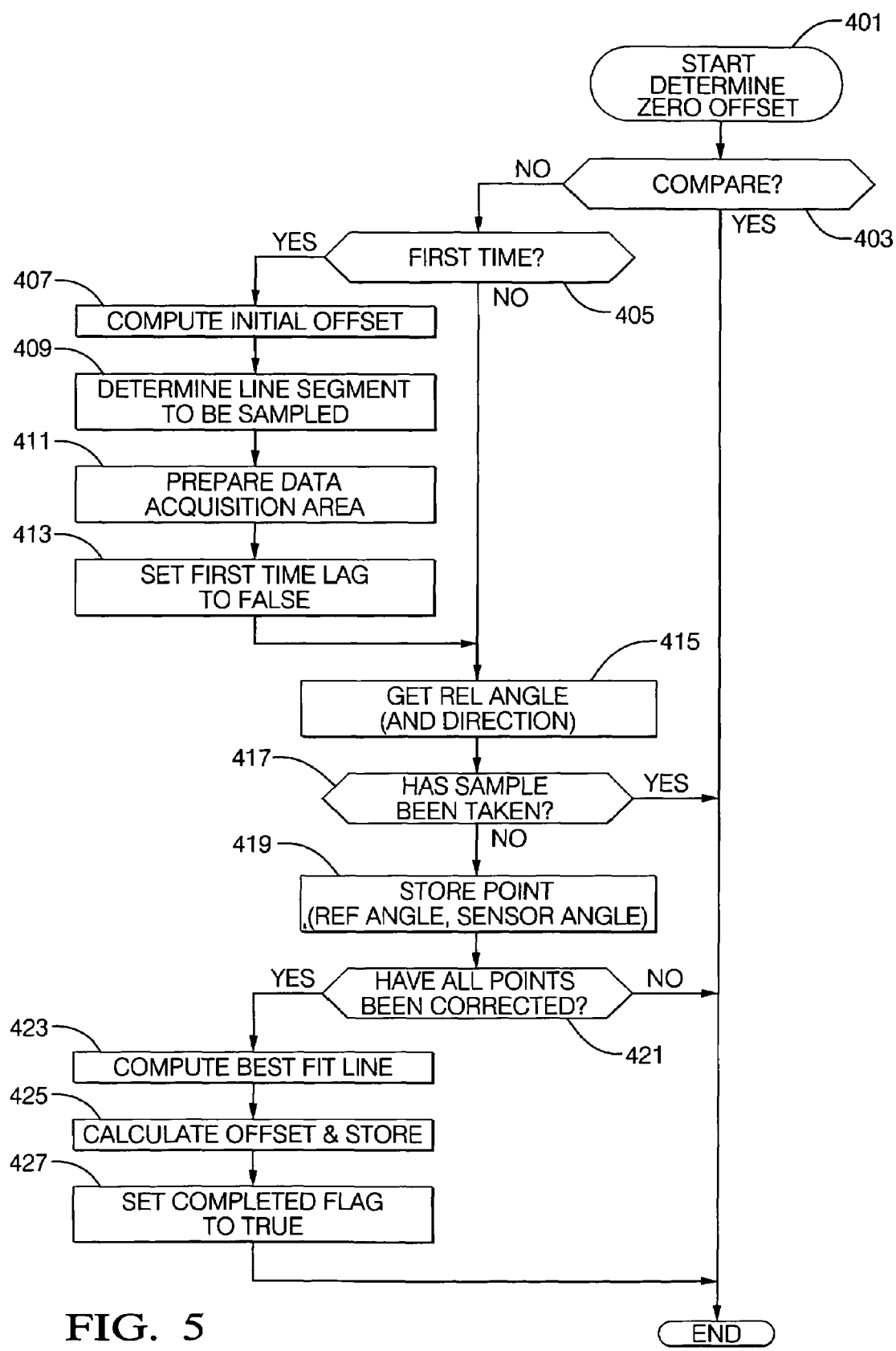
FIG. 5 is a flowchart setting forth a procedure for determining a position offset for the motor position sensor of FIG. 1 corresponding to a system zero position.

FIG. 5 is a flowchart setting forth a procedure for determining a position offset for motor position sensor 95 (FIG. 1) corresponding to a system zero position. The procedure commences at block 401 (FIG. 5). At block 403, a test is performed to determine whether or not a position offset has already been calculated. If so, the procedure exits, but it should be noted that the procedure may then recommence at block 401 as described in greater detail hereinafter. The negative branch from block 403 leads to block 405 where a test is performed to ascertain whether or not this is the first time that the procedure is being executed. If so, the procedure progresses to block 407 where an initial offset is computed. Next (block 409), a line segment to be sampled from steering wheel position sensor output 50 is determined (i.e., a sampling window is defined). A data acquisition area is prepared (block 411), and a "first time" flag is set to "FALSE" (block 413).

After block 413 is performed, the procedure advances to bock 415. The procedure also advances to block 415 by following the negative branch from block 405. At block 415, a reference angle (and, optionally, a direction) is obtained from motor position sensor 95 (FIG. 1). A test is performed at block 417 (FIG. 5) to determine whether the current data point has been previously sampled and stored. If so, the procedure exits, but it should be noted that the procedure may then recommence at block 401 as described in greater detail hereinafter. The negative branch from block 417 leads to block 419 where the sampled point is stored. The sampled point is defined using an X value representing a reference angle obtained from motor position sensor 95 and a Y value representing a sensor angle obtained from steering wheel position sensor output 50.

At block 421, a test is performed to determine whether all sampling points within the sample window have been taken. If not, the procedure exits, but it should be noted that the procedure may then recommence at block 401 as described in greater detail hereinafter. The positive branch from block 421 leads to block 423 where a best fit line 54 (FIG. 3) is computed from the stored sample points. This line 54 is computed as being the best fit for steering wheel position sensor output 50 (FIG. 3).

It should be noted that the procedure set forth in the flowchart of FIG. 5 may be executed periodically and/or repeatedly by controller 92 (FIG. 1) as part of an overall control scheme. In this manner, the procedure of FIG. 1 will continue to accumulate data points, a maximum of one new point per execution cycle, until all required data points have been collected. After all required data points have been collected, the best fit line is computed (block 423 of FIG. 5). Next, at block 425, a position offset for motor position sensor 95 (FIG. 1) corresponding to system zero position is computed using line 54. This position offset is stored (FIG. 5, block 427), and a "completed" flag is set to "TRUE".

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. An electric power steering system including:
   a steering wheel,
   an electric assist motor operatively coupled to the steering wheel,
   an electronic controller operatively coupled to the assist motor,
   a steering wheel position sensor for providing an output indicative of an angular position of the steering wheel, and
   a motor position sensor for providing an output indicative of a relative angular position for the motor;
   wherein the controller acquires the steering wheel position sensor output at each of a plurality of angular positions of the motor, thereby establishing a set of points defining a curvilinear relationship between the steering wheel sensor output and the motor position sensor output;
   the controller sampling the set of points to calculate a straight line which approximates the curvilinear relationship, thereby reducing periodic errors in the steering wheel sensor output.

2. The electric power steering system of claim 1 wherein the controller uses the straight line to determine a position offset for the motor position sensor output corresponding to a system zero position, the system zero position being a position for which the vehicle will travel along a linear, substantially straight-ahead path.

3. The electric power steering system of claim 2 wherein the controller uses the position offset for the motor position sensor output corresponding to a system zero position to determine an absolute angle reference for the motor position sensor.

4. The electric power steering system of claim 3 wherein the controller provides the absolute angle reference as a continuous output signal.

5. The electric power steering system of claim 1 wherein the electronic controller samples only a portion of the set of points, the portion including only points which occur in a sampling window.

6. The electric power steering system of claim 5 wherein the sampling window is defined in terms of a segment of steering wheel position sensor output as a function of motor sensor output.

7. The electric power steering system of claim 5 wherein the sampling window is defined in terms of a segment of motor sensor output as a function of steering wheel position sensor output.

8. The electric power steering system of claim 5 wherein the sampling window is defined as approximately one revolution of the steering wheel position sensor.

9. The electric power steering system of claim 5 wherein the sampling window is selected to reduce or cancel errors in steering wheel position sensor output caused by odd harmonic components, wherein odd harmonic components are defined with reference to a period of revolution of the steering wheel position sensor.

10. A method for controlling an electric power steering system comprising a steering wheel, an electric assist motor operatively coupled to the steering wheel, an electronic controller operatively coupled to the assist motor, a steering wheel position sensor for providing an output indicative of an angular position of the steering wheel, and a motor position sensor for providing an output indicative of a relative angular position for the motor; the method including:

acquiring the steering wheel position sensor output at each of a plurality of angular positions of the motor, thereby establishing a set of points defining a curvilinear relationship between the steering wheel sensor output and the motor position sensor output; and sampling the set of points to calculate a straight line which approximates the curvilinear relationship, thereby reducing periodic errors in the steering wheel sensor output.

11. The method of claim 10 further including using the straight line to determine a position offset for the motor position sensor output corresponding to a system zero position, the system zero position being a position for which the vehicle will travel along a linear, substantially straight-ahead path.

12. The method of claim 11 wherein an absolute angle reference for the motor position sensor is determined using the position offset for the motor position sensor output corresponding to a system zero position.

13. The method of claim 12 further including providing the absolute angle reference as a continuous output signal.

14. The method of claim 10 wherein sampling is performed by sampling only a portion of the set of points, the portion including only points which occur in a sampling window.

15. The method of claim 14 wherein the sampling window is defined in terms of a segment of steering wheel position sensor output as a function of motor sensor output.

16. The method of claim 14 wherein the sampling window is defined in terms of a segment of motor sensor output as a function of steering wheel position sensor output.

17. The method of claim 14 wherein the sampling window is defined as approximately one revolution of the steering wheel position sensor.

18. The method of claim 14 wherein the sampling window is selected to reduce or cancel errors in steering wheel position sensor output caused by odd harmonic components, wherein odd harmonic components are defined with reference to a period of revolution of the steering wheel position sensor.

\* \* \* \* \*